(12) United States Patent
Abou Mahmoud et al.

(10) Patent No.: US 10,650,100 B2
(45) Date of Patent: May 12, 2020

(54) NATURAL LANGUAGE GENERATION PATTERN ENHANCEMENT

(71) Applicant: INTERNATIONAL BUSINESS MACHINES CORPORATION, Armonk, NY (US)

(72) Inventors: Alaa Abou Mahmoud, Dracut, MA (US); Paul R. Bastide, Boxford, MA (US); Matthew E. Broomhall, Goffstown, NH (US); Robert E. Loredo, North Miami Beach, FL (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/003,540

(22) Filed: Jun. 8, 2018

(65) Prior Publication Data

US 2019/0377791 A1 Dec. 12, 2019

(51) Int. Cl.
*G10L 15/00* (2013.01)
*G10L 15/08* (2006.01)
(Continued)

(52) U.S. Cl.
CPC ...... *G06F 17/2785* (2013.01); *G06F 16/3344* (2019.01); *G06F 17/271* (2013.01); *G06F 17/2755* (2013.01)

(58) Field of Classification Search
CPC .......... G10L 15/00; G10L 15/26; G10L 15/18
See application file for complete search history.

(56) References Cited

U.S. PATENT DOCUMENTS 6,253,177 B1 * 6/2001 Lewis ................. G06F 3/16
704/235
7,930,169 B2 4/2011 Billerey-Mosier
(Continued)

OTHER PUBLICATIONS

Mell et al., "The NIST Definition of Cloud Computing", Recommendations of the National Institute of Standards and Technology, Special Publication 800-145, Sep. 2011, 7 pages.
(Continued)

*Primary Examiner* — Shreyans A Patel
(74) *Attorney, Agent, or Firm* — Anthony M. Pallone

(57) ABSTRACT

A computer-implemented method, computer system, and computer program product for improving a natural language generation knowledge base is provided. The method may include detecting user input comprising a natural language expression, generating an erroneous natural language response based on the user input and the knowledge base, determining user feedback corresponding to the erroneous natural language response, wherein the user feedback comprises an indication of an end-user reaction to the erroneous natural language response, determining an improvable performance metric with respect to the knowledge base, and updating the knowledge base based on the improvable performance metric, wherein the knowledge base comprises an explicit model of language corresponding to the erroneous natural language response, and wherein updating the knowledge base comprises updating the explicit model of language based on the user input, the erroneous natural language response, and the user feedback.

18 Claims, 5 Drawing Sheets

(51) Int. Cl.
  *G10L 15/22* (2006.01)
  *G06F 17/00* (2019.01)
  *G06F 17/27* (2006.01)
  *G06F 16/33* (2019.01)

(56) References Cited

U.S. PATENT DOCUMENTS

| | | | |
|---|---|---|---|
| 8,180,629 B2 | 5/2012 | Rehberg | |
| 9,396,235 B1 | 7/2016 | Wald et al. | |
| 9,483,459 B1 | 11/2016 | Riley et al. | |
| 9,535,894 B2 | 1/2017 | Carrier et al. | |
| 9,589,049 B1 | 3/2017 | Carrier et al. | |
| 9,678,947 B2 | 6/2017 | Allen et al. | |
| 9,692,457 B2 | 6/2017 | Blaettler et al. | |
| 9,940,931 B2* | 4/2018 | White | G06F 3/0236 |
| 10,082,864 B2* | 9/2018 | Kristensson | G06F 3/013 |
| 2003/0061030 A1 | 3/2003 | Kuboyama et al. | |
| 2005/0033574 A1* | 2/2005 | Kim | G10L 15/22 |
| | | | 704/251 |
| 2008/0071533 A1* | 3/2008 | Cave | G10L 15/197 |
| | | | 704/235 |
| 2009/0292530 A1* | 11/2009 | Jarmulak | G06F 17/2785 |
| | | | 704/10 |
| 2013/0013311 A1* | 1/2013 | Zheng | G10L 15/197 |
| | | | 704/257 |
| 2014/0032973 A1 | 1/2014 | Baker | |
| 2015/0127325 A1 | 5/2015 | Birnbaum et al. | |
| 2016/0350655 A1 | 12/2016 | Weiss et al. | |
| 2017/0004120 A1 | 1/2017 | Eck et al. | |
| 2017/0169021 A1* | 6/2017 | Battaglia | G06F 16/211 |

OTHER PUBLICATIONS

Meng et al., "Natural Language Response Generation in Mixed-Initiative Dialogs Using Task Goals and Dialog Acts", EUROSPEECH 2003—Geneva, Sep. 1-4, 2003, pp. 1689-1692.

Wang et al., "Supervised Detection and Unsupervised Discovery of Pronunciation Error Patterns for Computer-Assisted Language Learning", TASLP, IEEE/ACM Transactions on Audio, Speech, and Language Processing, vol. 23. Issue 3, Mar. 2015, pp. 564-579.

Ratnaparkhi, "Trainable Methods for Surface Natural Language Generation", ACM, Proceedings of the 1st NAACL Conference, Apr. 29-May 4, 2000, pp. 194-201.

Yeh et al., "Grammatical Error Detection Based on Machine Learning for Mandarin as Second Language Learning", Proceedings of the 3rd Workshop on Natural Language Processing Techniques for Educational Applications, Dec. 12, 2016, pp. 140-147.

* cited by examiner

NATURAL LANGUAGE GENERATION PATTERN ENHANCEMENT

BACKGROUND

The present invention relates generally to the field of natural language processing, and in particular to developing a knowledge base of a natural language generation system.

Natural language generation (NLG) is the natural language processing (NLP) task of generating natural language by way of machine learning models and a machine representation system such as a knowledge base or a logical form. NLG may be implemented by a computer system or computer program (e.g., as part of an NLP system) in determining, such as by deduction or inference, how to put concepts into words and generating expressions or texts corresponding to the words to facilitate natural language communications with an end-user. The communications may include the determined and generated texts, which may be provided in response to user inputs and queries. For example, NLG may be implemented by an intelligent or cognitive agent such as a virtual assistant or a question answering (QA) system to facilitate communications with an end-user to provide services including creating dialogue, providing information, answering questions, and performing various other information retrieval tasks.

SUMMARY

A computer-implemented method, computer system, and computer program product for improving a natural language generation knowledge base is provided. In an aspect, the method may include detecting user input comprising a natural language expression, generating an erroneous natural language response based on the user input and the knowledge base, determining user feedback corresponding to the erroneous natural language response, wherein the user feedback comprises an indication of an end-user reaction to the erroneous natural language response, determining an improvable performance metric with respect to the knowledge base, and updating the knowledge base based on the improvable performance metric, wherein the knowledge base comprises an explicit model of language corresponding to the erroneous natural language response, and wherein updating the knowledge base comprises updating the explicit model of language based on the user input, the erroneous natural language response, and the user feedback.

BRIEF DESCRIPTION OF THE DRAWINGS

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1:
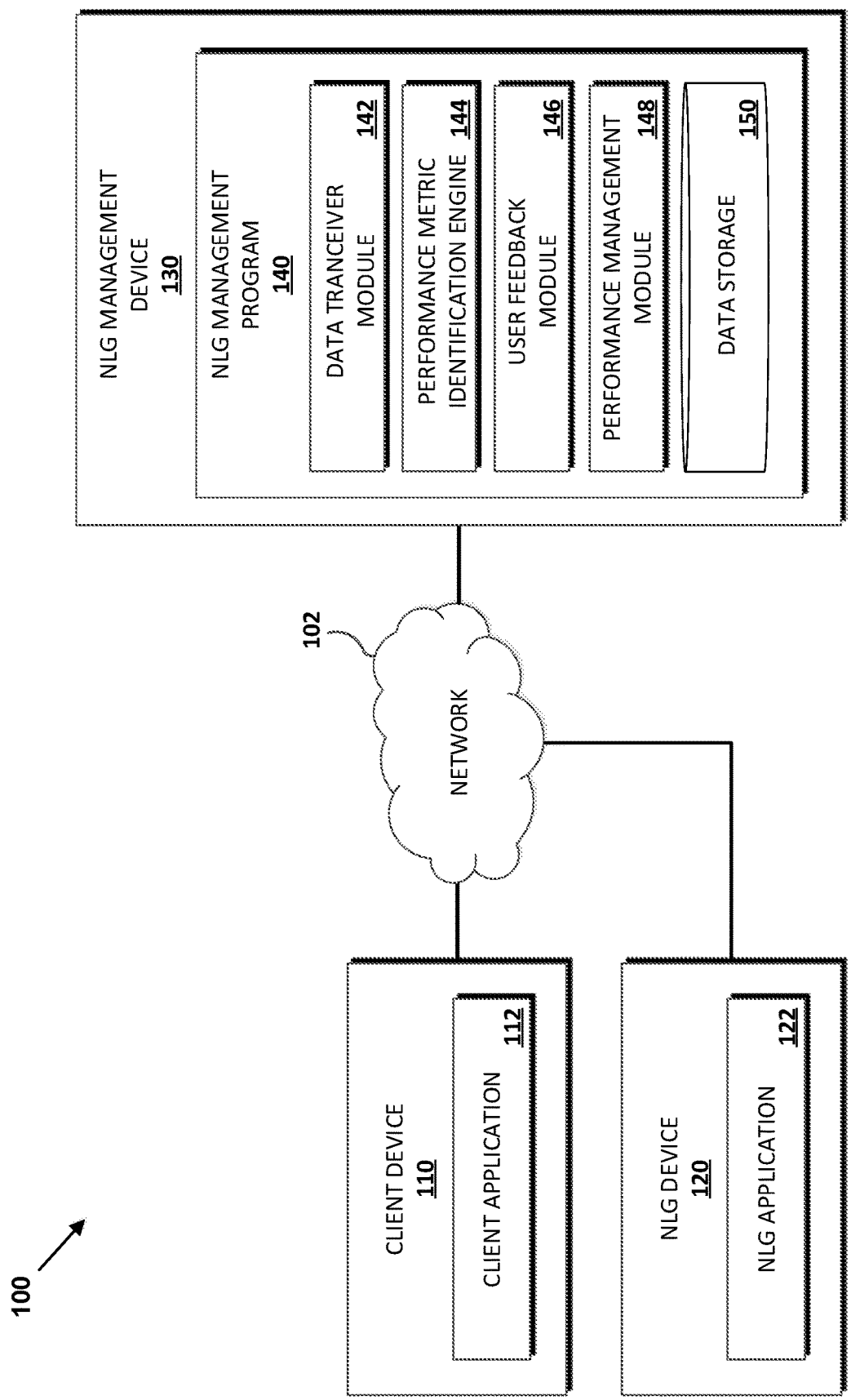
FIG. 1 is a functional block diagram depicting an natural language generation management system, in accordance with an embodiment of the present invention.

Detailed embodiments of the present invention are disclosed herein for purposes of describing and illustrating claimed structures and methods that may be embodied in various forms, and are not intended to be exhaustive in any way, or limited to the disclosed embodiments. Many modifications and variations will be apparent to those of ordinary skill in the art without departing from the scope and spirit of the disclosed embodiments. The terminology used herein was chosen to best explain the principles of the one or more embodiments, practical applications, or technical improvements over current technologies, or to enable those of ordinary skill in the art to understand the embodiments disclosed herein. As described, details of well-known features and techniques may be omitted to avoid unnecessarily obscuring the embodiments of the present invention.

References in the specification to "one embodiment," "an embodiment," "an example embodiment," or the like, indicate that the embodiment described may include one or more particular features, structures, or characteristics, but it shall be understood that such particular features, structures, or characteristics may or may not be common to each and every disclosed embodiment of the present invention herein. Moreover, such phrases do not necessarily refer to any one particular embodiment per se. As such, when one or more particular features, structures, or characteristics is described in connection with an embodiment, it is submitted that it is within the knowledge of those skilled in the art to affect such one or more features, structures, or characteristics in connection with other embodiments, where applicable, whether or not explicitly described.

In general, any system or device designed for use by humans and people should be easy to use, easy to learn, easy to remember (the instructions), and helpful to end-users. To support and enhance an overall effectiveness, usability, and helpfulness (i.e., performance and effectiveness) of an NLP system, an NLG system may be implemented to determine and generate texts to provide human-like responses to user inputs. That is, the NLG system may be implemented to support a capacity of the NLP system to exhibit intelligent behavior (i.e., via natural language communications) equivalent to, or indistinguishable from, that of a human. As such, the NLG system may enable effective, helpful, and robust interactions with end-users which may require, for example, providing intelligent, clear, and helpful responses to questions, and the like. An extent to which such performance may be achieved may depend on the scope and extent of the knowledge base by which the NLG system may be implemented, particularly with respect to the scope and extent of the explicit models of language by which the texts may be determined and generated.

One way to measure or evaluate the performance of an NLG system, as well as the quality (e.g., helpfulness, clarity, etc.) of the determined and generated texts, may include, for example, task-based (extrinsic) evaluation. Task-based evaluation may include, for example, providing the texts to an end-user and assessing how well the texts help the end-user perform a task, or otherwise to what extent the texts achieve the intended communicative goal. For example, a system (e.g., an NLG system) which generates summaries of medical data can be evaluated by giving these summaries to doctors, and assessing whether the summaries help the doctors make better decisions.

Task based evaluations are time-consuming and expensive, and can be difficult to conduct or carry out (especially if they require subjects with specialized expertise, such as doctors). Further, the quality of the texts, as evaluated and assessed by individual end-users, may depend and vary based on unique personal factors associated with each individual end-user, thereby contributing to the difficulties of conducting the evaluations. For example, while one end-user may assess certain texts as being helpful, another end-user may assess the same texts as being unhelpful, or even confusing. That is, the unique personal factors associated with each individual end-user may distinctly impact the way in which each end-user interprets and understands language, and as a result, the perceived quality of the texts. Such factors associated with each end-user may include demographics, character, cultural influences, age, and the like. As a result, task-based evaluations of NLG systems are the exception, not the norm.

Accordingly, there is a need for a method to effectively and efficiently identify, evaluate, and improve aspects of the performance of NLG systems according to the different needs and requirements of end-users.

For purposes of the present disclosure, "erroneous natural language response" may refer to a natural language response including a natural language error; "NLG-generated texts" may refer to texts and/or speech that may be generated by an NLG system to provide natural language communications based on and with respect to user input from an end-user; and "end-user characteristics" may refer to the unique personal factors associated with one or more individual end-users. The natural language error may include incorrect or improperly applied grammars, language patterns, and/or language templates.

Embodiments of the present invention are directed to a method, system, and computer program product for measuring, evaluating, and improving (i.e., developing and updating) the performance of an NLG system. In an aspect, the performance may be measured and evaluated based on texts generated by the NLG system. In an aspect, the quality of the texts may be evaluated with respect to associated end-user characteristics. In an aspect, the measurement and evaluation may be performed based on input from an end-user. In various aspects, the method may include receiving user input, and generating a corresponding natural language response, wherein the response includes a natural language error. The natural language response may include texts and/or speech that may be generated by the NLG system with respect to the user input. In an aspect, the method may include prompting the end-user to provide user feedback with respect to the generated natural language response. The user feedback may indicate a level of satisfaction of the user with the generated natural language response. In an aspect, the method may include determining whether the end-user has identified the natural language error. In the various aspects, the method may include scoring the natural language response including the error with respect to the original natural language response based on the error. The original natural language response may include a response that does not include the error (i.e., an otherwise unaltered natural language response). In the various aspects, the method may include updating the knowledge base (i.e., by which the NLG system is implemented) based on the scoring of the response.

Advantageously, the present invention may be implemented to effectively and efficiently evaluate and improve the performance of an NLG system while reducing the otherwise required time and resource costs. Further, the present invention may be implemented to mitigate the difficulties associated with conducting the evaluations and applying the improvements to the NLG system with respect to numerous and various end-user populations, so as to enable tailoring or adaptation of natural language communications by the NLG system based on end-user characteristics of individual end-users.

FIG. 1 is a functional block diagram depicting an NLG management system 100, in accordance with an embodiment of the present invention. The NLG management system 100 may include a client device 110, an NLG device 120, and an NLG management device 130, each interconnected over a network 102. While FIG. 1 depicts two discrete devices, other arrangements may be contemplated. For example, the NLG management system 100 may include multiple distinct devices such as the client device 110 and/or the NLG management device 130. Further, the client device 110, the NLG device 120, and/or the NLG management device 130 may include one or more integrated or distinct devices.

In various embodiments of the present invention, the network 102 may include, for example, an intranet, a local area network (LAN), a personal area network (PAN), a wireless local area network (WLAN), a wireless personal area network (WPAN), a wireless mesh network, a wide area network (WAN) such as the Internet, or the like. The network 102 may include wired, wireless, or fiber optic connections. Generally, the network 102 may include any combination of connections and protocols for supporting communications between the client device 110, the NLG device 120, and the NLG management device 130, in accordance with embodiments of the present invention.

In various embodiments of the present invention, the client device 110, the NLG device 120, and/or the NLG management device 130 may include a computing platform or node such as a wearable device, an implantable device, a mobile or smart phone, a tablet computer, a laptop computer, a desktop computer, a server such as a database server, a virtual machine, or the like. In the various embodiments, the client device 110, the NLG device 120, and/or the NLG management device 130 may otherwise include any other type of computing platform, computer system, or information system capable of sending and receiving data to and from another device, such as by way of the network 102. In certain embodiments, the client device 110, the NLG device 120, and/or the NLG management device 130 may include internal and external hardware components, such as described with reference to FIG. 3. In other embodiments, the client device 110, the NLG device 120, and/or the NLG management device 130 may be implemented in a cloud computing environment, such as described with reference to FIGS. 4 and 5.

In an embodiment of the present invention, the client device 110 may include, for example, a client computing platform for hosting a client application 112. In the embodiment, the client device 110 may include, for example, an image-capture device (not depicted). The client device 110 may implement a combination of devices and technologies such as network devices and device drivers to support the operation of the client application 112 and the image-capture device, and provide a platform enabling communications between the client device 110, the NLG device 120, and the NLG management device 130, in accordance with embodiments of the present invention.

The client application 112 may include, for example, an application or program such as a software program, one or more subroutines contained in a program, and/or an application programming interface. In an embodiment of the present invention, the client application 112 may be implemented by the end-user to communicate and interact with, or otherwise use and gain access to an NLG system. The client application 112 may receive user inputs from the end-user for communication with the NLG system such as by way of the network 102. The client application 112 may receive or detect the user inputs by way of a node (not depicted) in communication with the client device 110. For example, the node may include a user input device such as a microphone, a keyboard, or the like. In the embodiment, the client application 112 may generate a display instance of the NLG-generated texts from the NLG system by implementing a display of the client device 110.

In an embodiment of the present invention, the user inputs may include, for example, data corresponding to texts and/or speech from the end-user. In the embodiment, the client application 112 may receive natural language communications from the NLG system with respect to the user inputs for display by way of the client device 110 (i.e., for viewing by the end-user). In the embodiment, the natural language communications from the NLG system may include data corresponding to NLG-generated texts.

For purposes of the present disclosure, "natural language communications data" may refer to data including the data corresponding to texts and/or speech from the end-user and the data corresponding to NLG-generated texts.

In an embodiment of the present invention, the image-capture device may include, for example, an optical sensor, an image sensor, a photodetector, or the like. For example, the image-capture device may include a camera, a video camera, an infrared sensor, and/or a CMOS sensor, which may be integrated into a mobile or smart phone, a tablet computer, a laptop computer, or a desktop computer such as the client device 110. In the embodiment, the client application 112 may control the operation of the image-capture device to capture images of an end-user, and to generate corresponding image capture data. In the embodiment, the image-capture device may operate to capture the images and generate the image capture data during usage of the client device 110 by the end-user. In the embodiment, the image capture data of the end-user may include, for example, real time imagery, video, visualization, and/or representation of facial expressions, gestures, eye-movements, and/or eye-rotations.

For purposes of the present disclosure, "natural language communications data" may refer to data including the image capture data.

In an embodiment of the present invention, the client application 112 and the image-capture device may be implemented in performing end-user attention monitoring. In the embodiment, the end-user attention monitoring may be performed to generate end-user feedback data. The end-user feedback data generated by the end-user attention monitoring may correspond to a user response of the end-user to natural language communications from the NLG system, as such may be associated with a corresponding user input from the end-user.

In an embodiment of the present invention, the client application 112 may be implemented in prompting the end-user for user feedback. In the embodiment, the prompting may be performed to generate end-user feedback data. The end-user feedback data generated by the prompting may indicate or correspond to a level of satisfaction of the end-user with natural language communications from the NLG system, as such may be associated with a corresponding user input from the end-user.

For purposes of the present disclosure, "natural language communications data" may refer to data including the end-user feedback data.

In an embodiment of the present invention, the NLG device 120 may include, for example, a client computing platform for hosting an NLG application 122. In the embodiment, the NLG device 120 may include (i.e., host) the NLG system. The NLG device 120 may implement a combination of devices and technologies such as network devices and device drivers to support the operation of the NLG application 122 and the NLG system and provide a platform enabling communications between the client device 110, the NLG device 120, and the NLG management device 130, in accordance with embodiments of the present invention.

The NLG application 122 may include, for example, an application or program such as a software program, one or more subroutines contained in a program, and/or an application programming interface. In an embodiment of the present invention, the NLG application 122 may implement an NLG system to support natural language communications and interactions with an end-user. The NLG application 122 may interface with the client application 112 to receive user inputs from the end-user and communicate NLG-generated texts to support the natural language communications. In the embodiment, the NLG application 122 may implement the NLG system to generate natural language responses including NLG-generated texts and/or speech corresponding to texts and/or speech of the user inputs. In the embodiment, the generated responses may include, for example, NLG-generated texts and/or speech generated by the NLG system. The NLG-generated texts and/or speech may be generated based on corresponding user inputs from the client application 112. In the embodiment, the generated natural language responses may include erroneous natural language responses. The generated natural language responses may be communicated to the client application 112, such as by way of the network 102, in response to receiving communications including the user inputs from the client application 112.

The texts and/or speech may include, for example, expressions for conveying ideas or concepts. For example, the expression may include a string or set of words and/or letters including texts arranged to convey a corresponding intent, desire, sentiment, or the like. That is, the texts and/or speech, such as from the end-user, may include or represent requests, phrases, questions, documents, statements, exclamations, commands, utterances, and the like. The NLG-generated texts and/or speech may correspond to the texts and/or speech from the end-user, and may include or represent various types of information such as in the form of answers, documents, statements, exclamations, commands, utterances, and the like. In general, the NLG-generated texts and/or speech may be provided to facilitate communications with the end-user, such as by provide services including creating dialogue, providing information, answering questions, and performing various other information retrieval tasks.

In an embodiment of the present invention, the NLG management device 130 may include, for example, a client computing platform for hosting an NLG management program 140. The NLG management device 130 may implement a combination of devices and technologies such as network devices and device drivers to support the operation of the NLG management program 140 and provide a platform enabling communications between the client device 110, the NLG device 120, and the NLG management device 130, in accordance with embodiments of the present invention.

The NLG management program 140 may include, for example, an application or program such as a software program, one or more subroutines contained in a program, and/or an application programming interface. The NLG management program 140 may be implemented to manage the natural language communications and interactions between the NLG system and end-users. The NLG management program 140 may include a data transceiver module 142, an performance metric identification engine 144, a user feedback module 146, a performance management module 148, and a data storage 150.

The data transceiver module 142 receives data corresponding to the user inputs from the end-users, which is communicated between the client application 112 and the NLG application 122 by the end-users with respect to the NLG system. The data transceiver module 142 further receives data corresponding to the natural language communications and interactions between the NLG system and the end-users that are responsive to the user inputs communicated from the client application 112 to the NLG application 122. The data collection module 132 may store the retrieved data in the data storage 150 for later retrieval and use.

The performance metric identification engine 144 measures and evaluates the performance of the NLG system to identify a performance metric of the NLG system to improve. In an embodiment of the present invention, the performance of the NLG system may be measured and evaluated based on data corresponding to a knowledge base by which the NLG system may produce the NLG-generated texts. In the embodiment, the performance may further be measured and evaluated based on data corresponding to the natural language communications and interactions between the NLG system and the end-users, including data corresponding to the texts of the user inputs, the NLG-generated texts produced by the NLG system, and the end-user feedback data. In the embodiment, the performance metric may be identified by generating and communicating an erroneous natural language response to an end-user in response to a corresponding user input received by the NLG system.

NLP systems (by which NLG systems may be implemented) typically derive meaning from human or natural language input using algorithms based on statistical inference. NLP systems may perform a "training" stage in which learning models learn domain rules by analyzing a corpora (e.g., including text and/or speech corpora having "real world" texts) and generating a knowledge base from which to access. The learning models may include statistical algorithms and models derived from various texts of the corpora. The knowledge base may include an ontology or object model having data objects corresponding to associated texts of the corpora. The knowledge base may include explicit models of language based on and represented by the data objects. The explicit models of language may include, for example, grammars, language patterns, and language templates based on various texts of the corpora. The knowledge base may relate to a particular domain, such as to that of the corpora. The learning models may be developed to learn and apply natural language rules with respect to the data objects of the knowledge base and data objects (e.g., corresponding to texts and/or speech) of received user inputs. The natural language rules may be derived from the texts of the corpora.

For example, the learning models may perform syntactic analysis or semantic analysis at various levels during the training stage. For the syntactic analysis, the learning models may implement algorithms to, for example, determine mappings to define and predict part-of-speech tags for words in a given sentence (e.g., noun, verb, adjective), as well as the various relationships between the different words (e.g., subject, object and other modifiers). For the semantic analysis, the learning models may implement algorithms in, for example, noun-phrase extraction, tagging the extracted noun-phrases (e.g., person, organization, location, common noun, etc.), clustering noun-phrases referring to the same entity, resolving mentions of entities in documents against entities in the knowledge base, relation and knowledge extraction, and so on.

Upon completion of the training stage, the NLP systems may be applied to implement an NLG system based on the learning models and the generated knowledge base, to facilitate natural language communications with an end-user. The learning models may implement various reasoning algorithms to apply learned natural language rules to the language of a user input with respect to the language of corresponding texts in the knowledge base. That is, the rules may be applied with respect to the explicit models of language in the knowledge base, as such may be based on and represented by the data objects corresponding to and associated with the texts of the corpora.

For example, after an intent (e.g., a question or request) of a user input is interpreted and determined (e.g., by an NLP system), an NLG system may be implemented to apply the rules learned by the learning models with respect to the knowledge base in determining an appropriate response (e.g., an answer to the question) to the user input, and determining and generating texts to express or convey the determined response to the end-user. Some reasoning algorithms may look at the matching of terms and synonyms within the language of the user input and the corresponding texts of the corpora. Other reasoning algorithms may look at various contextual factors such as temporal or spatial features in the language, while others may evaluate the source of the portion of the corpora of data and evaluate its veracity.

The user feedback module 146 performs the end-user attention monitoring, and may also prompt the end-users for user feedback. In an embodiment of the present invention, the end-user feedback data may include data corresponding to the end-user attention monitoring and user feedback produced by the prompting.

The performance management module 148 scores the erroneous natural language responses with respect to corresponding non-erroneous natural language responses, based on the errors of the erroneous natural language responses. The performance management module 148 further updates the knowledge base by which the NLG system is implemented based on the scoring with respect to an identified performance metric to improve the performance of the NLG system. Updating the knowledge base may include retraining the NLG system based on the updated knowledge base.

Figure 2:
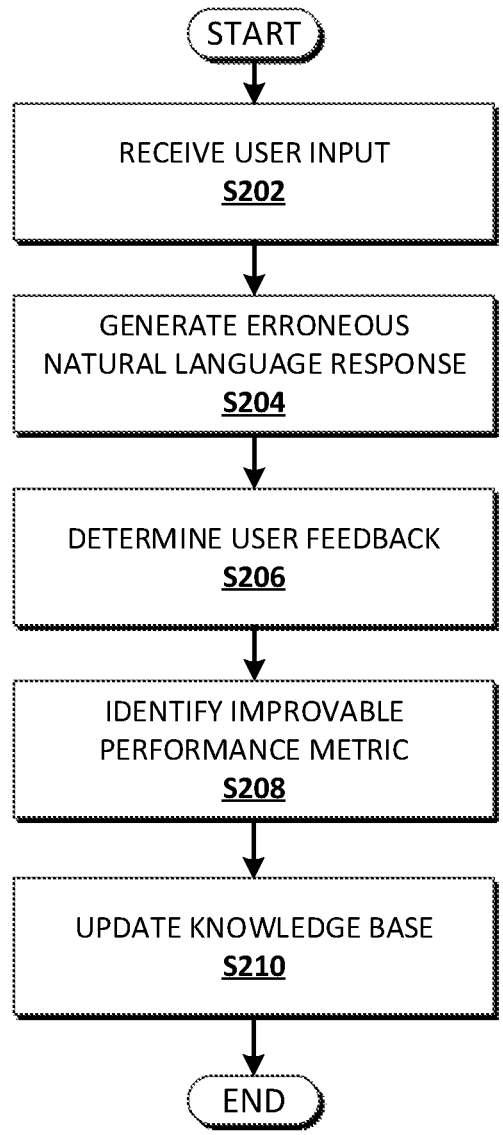
FIG. 2 is a flowchart depicting operational steps of an aspect of the natural language generation management system, in accordance with an embodiment of the present invention.

FIG. 2 is a flowchart depicting operational steps of an aspect of the NLG management system 100, in accordance with an embodiment of the present invention.

At step S202, the data transceiver module 142 receives the natural language communications data. In an embodiment of the present invention, the natural language communications data may include data that corresponds to user input from an end-user, as previously described. Receiving the natural language communications data may include, for example, monitoring data logs or log files on the NLG device 120 corresponding to the natural language communications between the NLG system with the end-user.

At step S204, the performance metric identification engine 144 generates an erroneous natural language response. In an embodiment of the present invention, the erroneous natural language response may be generated for implementation in identifying and determining an improvable performance metric of the NLG system, as described in further detail below with reference to Step S208.

For example, the erroneous natural language response may be generated to include potentially incorrect grammar in order to determine whether a grammar-related aspect of the corresponding explicit model of language, by which a corresponding natural language response may otherwise be generated, includes any defects. In an embodiment of the present invention, the defects may include, for example, contextual defects associated with end-user characteristics unique to a particular end-user. Erroneous natural language responses may include a natural language error including NLG-generated texts, which may be generated based on corresponding natural language communications between the NLG system and the end-users. In the embodiment, the natural language error may include NLG-generated texts corresponding to an incorrect application of one or more linguistic rules of the natural language used in the communications.

In an embodiment of the present invention, the erroneous natural language response may be generated based on, for example, the user input from the end-user and the knowledge base by which the NLG system may be implemented. In the embodiment, the erroneous natural language response may be incorrect according to one or more rules of syntax, semantics, morphology, and orthography of the natural language used in the communications. In the embodiment, the erroneous natural language response may be generated based on the knowledge base with respect to an explicit model of language. The explicit model of language may include grammar, language patterns, and/or language templates, as previously described. In the embodiment, the erroneous natural language response may include, for example, a grammatical error, a language pattern error, and the like. The language pattern error may include, for example, an erroneously constructed sentence or phrase. In the embodiment, the erroneous natural language response may include, for example, a word-, phrase-, or sentence-level error. In the embodiment, the natural language error may be inserted or injected into a corresponding position or portion of an original or otherwise unaltered natural language response.

For example, the erroneous natural language response may include a sentence-level error in which "to be" is erroneously used for the future tense of "will be." In other words, the erroneous natural language response may include an error that may be inserted into or used to replace a corresponding position or portion previously occupied by texts of an original or otherwise unaltered natural language response. The unaltered natural language response may include one that may have otherwise corresponded to the user input from the end-user, as such may be determined by the NLG system based on the knowledge base.

In an embodiment of the present invention, an erroneous natural language response may be generated to include a context identical to that of the corresponding unaltered natural language response. That is, the erroneous natural language response may be generated to avoid introducing contextual alterations to the erroneous natural language response with respect to the corresponding, non-erroneous natural language response.

In an embodiment of the present invention, the context may be associated with a class or group of intent, answer, category, topic, taxonomy, domain, label, and the like. A class of expressions may include, for example, similar but distinct expressions which include subtle differences that each correspond to a particular intent. As an example, a class of expressions may include expressions corresponding to the same category, topic, taxonomy, answer, or domain of intent. A particular training set may include the class of expressions and may form a basis for training the NLC to map an unknown expression (i.e., an expression having an initially unknown intent) to an intent of the class of expressions. In the embodiment, the erroneous natural language response may include a context corresponding to that of the corresponding unaltered natural language response and/or that of the user input.

At step S206, the user feedback module 146 determines the user feedback. In the embodiment, the user feedback may include an indication of an end-user reaction to the erroneous natural language response. In an embodiment of the present invention, the user feedback may be determined by performing end-user attention monitoring. In the embodiment, the user feedback may additionally or alternatively be determined by prompting the end-user for user feedback. The user feedback may be determined based on the end-user feedback data generated by the end-user attention monitoring, the prompting of the user, or both. The user feedback module 146 may communicate executable instructions to the client application 112 in performing the end-user attention monitoring and the prompting of the end-user. In the embodiment, the end-user attention monitoring may be performed in real time during the usage of the client device 110 by the end-user.

In an embodiment of the present invention, the end-user attention monitoring may be performed with respect to an end-user based on a display instance of an erroneous natural language response. In the embodiment, the erroneous natural language response may include NLG-generated texts. In the embodiment, the end-user attention monitoring may include determining an awareness of the end-user of a natural language error in the erroneous natural language response.

In an embodiment of the present invention, determining the awareness of the end-user of the natural language error in the erroneous natural language response may include performing eye-tracking, gaze-tracking, eye-gaze tracing, and the like ("eye tracking"). Eye movements are typically divided into fixations and saccades—when the eye gaze pauses in a certain position, and when it moves to another position, respectively. The resulting series of fixations and saccades is called a scanpath. Scanpaths are useful for analyzing cognitive intent, interest, and salience. The scanpath of a particular end-user may be affected by end-user characteristics unique to the particular end-user. Eye tracking in human-computer interaction (HCI) typically investigates the scanpath for usability purposes, or as a method of input in gaze-contingent displays, also known as gaze-based interfaces. Fixational eye movements include micro saccades: small, involuntary saccades that occur during attempted fixation. Hence, the locations of fixations or smooth pursuit along a scanpath show what information loci on the stimulus were processed during an eye-tracking session. On average, fixations last for around 200 milliseconds during the reading of linguistic text, and 350 ms during the viewing of a scene.

In the embodiment, the eye tracking may be performed with respect to the end-user based on the image capture data to determine a point or direction of gaze and/or eye motion relative to the head (collectively, "point of gaze"). In the embodiment, the point of gaze may be determined with respect to positions of NLG-generated texts in the display instance. In the embodiment, the image capture data may include a frame rate and a level of detail and resolution sufficient to continuously determine and measure the point of gaze and/or the eye motion. For example, the point of gaze of the end-user may be determined with respect to a specific text (e.g., a word or phrase) of the NLG-generated texts, as such may be displayed by way of the client device 110. The end-user attention monitoring may be performed by way of a non-contact, optical method for measuring point of gaze and/or eye motion. For example, the eye tracking may including transmitting infrared light towards an eye of the end-user for reflection, receiving the reflected infrared light by the image-capture device, and determining (i.e., deducing) eye positions, movements, and rotations based on variations in the reflected and received light. A point of gaze at a given point in time may be determined based on the deduced eye positions, movements, and rotations with respect to the natural language response in the display instance. The particular optical method for measuring the point of gaze and/or the eye motion may be chosen as a matter of design, in accordance with embodiments of the present invention.

In an embodiment of the present invention, a determination that the end-user is aware of the natural language error in the erroneous natural language response may be made based on a coincidence of the point of gaze with a position of the natural language error (i.e., with respected to the corresponding NLG-generated texts) in the display instance. In the embodiment, the determination of awareness may be made where a duration of the coincidence includes a duration exceeding a predetermined threshold. In the embodiment, the coincidence of the point of gaze with the position of the natural language error may be determined based on the scanpath of the end-user with respect to the display instance.

In an embodiment of the present invention, determining the awareness of the end-user of the natural language error in the erroneous natural language response may include performing mouse tracking, pointer tracking, cursor tracking, and the like ("mouse tracking"). In the embodiment, the mouse tracking may be performed with respect to mouse or cursor positions on the client device 110 based on device input data from the node in communication with the client device 110. In the embodiment, a determination that the end-user is aware of the natural language error in the erroneous natural language response may be made based on a coincidence of cursor position with a position of the natural language error (i.e., with respected to the corresponding NLG-generated texts) in the display instance. In the embodiment, the determination of awareness may be made where a duration of the coincidence includes a duration exceeding a predetermined threshold.

In an embodiment of the present invention, the prompting of the end-user for user feedback may be performed by displaying a prompt on a display of the client device 110, and querying the user for the feedback by way of the prompt. The particular prompting method for determining the user feedback may be chosen as a matter of design, in accordance with embodiments of the present invention.

At step S208, the performance management module 148 identifies and determines improvable performance metrics of the NLG system. In an embodiment of the present invention, an improvable performance metric may be identified and determined by scoring the erroneous natural language response with respect to the corresponding original natural language response (e.g., the non-erroneous natural language response) based on the natural language error. In the embodiment, the erroneous natural language response may be scored with respect to a corresponding user input based on associated end-user feedback data. The original natural language response may include a response that does not include the error (i.e., an otherwise unaltered natural language response). In the embodiment, the scoring may be performed to conduct a task-based evaluation of the performance of the NLG system. The task-based evaluation may be conducted to determine the degree to which a linguistic rule of the natural language used in the communications may be incorrectly applied, contextually or otherwise.

In an embodiment of the present invention, an improvable performance metric by which to measure and improve the performance of the NLG system may be identified and determined based on the scoring of the erroneous natural language response. In the embodiment, the scoring may be performed to generate a score indicative of a degree of performance of the NLG system. The degree of performance may reflect the quality (e.g., helpfulness, clarity, etc.) of one or more explicit models of language by which corresponding NLG-generated texts may be generated by the NLG system. In the embodiment, the improvable performance metric may be identified with respect to the one or more explicit models of language associated with a scored erroneous natural language response.

In an embodiment of the present invention, the improvable performance metric may be identified by scoring of an erroneous natural language response and corresponding non-erroneous natural language response, the associated natural language error, the corresponding user input, and the associated end-user feedback data, with respect to one or more explicit models of language. In the embodiment, a score may be determined to indicate a quality and usefulness of the one or more explicit models of language by which NLG-generated texts (i.e., of the natural language response) may be generated by the NLG system. That is, the scoring may be performed to identify a contextual defect of the corresponding one or more explicit models of language, and/or to determine an extent to which the corresponding one or more explicit models of language may be incorrectly applied. A score may be determined as a function of end-user characteristics associated with a particular end-user or a population of end-users.

For example, a natural language response including a low level of quality and usefulness may be scored negatively (i.e., so as to unreinforce associated relationships), and a natural language response including a high level of quality and usefulness may be scored positively (i.e., so as to reinforce associated relationships). In an embodiment of the present invention, a low or negative score may indicate an incorrect application of an explicit model of language, which may include, for example, incorrect or improperly applied grammars, language patterns, and/or language templates. In the embodiment, a low or negative score may additionally or alternatively indicate a contextual defect of the explicit model of language, which may include, for example, errors and defects related to syntax, semantics, morphology, and orthography.

In an embodiment of the present invention, a score may be determined for an erroneous natural language response with respect to the associated natural language error based on corresponding end-user feedback data. In the embodiment, the end-user feedback data may include an indication of an end-user reaction to the erroneous natural language response, as described with reference to Step S206. In the embodiment, the score may represent the number of incorrect words and the likelihood of user awareness of the incorrect words of the natural language error.

For example, the score may be determined to be negative where end-user eye fixation on the natural language error exceeds a predetermined threshold (e.g., 200 milliseconds). The end-user eye fixation may be determined based on the end-user feedback data. The end-user eye fixation on the natural language error may indicate end-user awareness of the natural language error, and correspond to a negative end-user reaction to the natural language error. Where the end-user eye fixation on the natural language error exceeds the predetermined threshold with respect to a population of end-users, the corresponding erroneous natural language response may be scored negatively. The negative score may be used to indicate a high probability of incorrect application of an associated explicit model of language, a high probability of contextual defect of the explicit model of language, or both.

As another example, the score may be determined to be negative based on end-user prompting data indicating a low level of quality, usefulness, or satisfaction as perceived by an end-user with respect to a corresponding erroneous natural language response. The end-user prompting data may include an end-user response to an associated end-user prompt, which may be provided to the end-user with respect to the erroneous natural language response.

As another example, the improvable performance metric may be identified and determined by detection of a frustrated reaction of an end-user to the erroneous natural language response based on the end-user attention monitoring data. An emotional reaction of the end-user to the erroneous natural language response may be determined using an emotional state recognition technique, in accordance with embodiments of the present invention.

In general, an erroneous natural language response may be scored based on NLG-generated texts so as to indicate end-user specific or end-user population-specific quality, usefulness, and/or satisfaction, in accordance with embodiments of the present invention. The indication may be determined by the prompting and/or the end-user attention monitoring.

At step S210, the performance management module 148 updates the knowledge base of the NLG system based on the results of step S208. In an embodiment of the present invention, the knowledge base may be updated based on the scoring of the erroneous natural language response based on the corresponding original natural language response with respect to the natural language error. The NLG system may implement the updated knowledge base to generate natural language by way of machine learning models to support natural language communications with one or more end-users. The updated knowledge base may be implemented to enhance performance and increase a capacity of the NLG system to exhibit intelligent behavior (i.e., via natural language communications) equivalent to, or indistinguishable from, that of a human, in order to enable and facilitate effective, helpful, and robust interactions with the end-users. In the embodiment, updating the knowledge base may include, for example, performing a training stage in which learning models of the NLG system learn domain rules by analyzing an expanded corpora (e.g., including text and/or speech corpora having "real world" texts) and generating the expanded knowledge base from which to access. In the embodiment, corpora may be expanded based on user input data and corresponding end-user feedback data.

As an example, the updated knowledge base may be implemented to facilitate derivation of expanded natural language rules by the learning models of the NLG system from the texts of the expanded corpora. The learning models may be developed to learn and apply natural language rules with respect to the data objects of the knowledge base and data objects (e.g., corresponding to texts and/or speech) of received user inputs.

In an embodiment of the present invention, the updated knowledge base may include an expanded scope and extent, particularly with respect to the scope and extent of the explicit models of language, relative to that of the initial knowledge base prior to the updating. In the embodiment, the expanded scope and extent of the updated knowledge base may be generated based on text and/or speech of the expanded corpora corresponding to the initial corpora of the initial knowledge base. In the embodiment, the updated knowledge base may include an expanded ontology or object model having data objects corresponding to associated texts of the expanded corpora upon which the explicit models of language may be based and represented. In the embodiment, the scope and extent of the explicit models of language of the updated knowledge base may be expanded with respect to one or more grammars, language patterns, and language templates based on the texts and/or speech of the expanded corpora. In the embodiment, the updated knowledge base may relate to a domain corresponding to that of the initial knowledge base and corpora.

In an embodiment of the present invention, the updating of the knowledge base may include, for example, weighting mappings of part-of-speech tags for words (i.e., of the initial knowledge base) with respect to syntactic relationships, semantic relationships, or both, in accordance with the scoring of erroneous natural language responses. In the embodiment, the updating of the knowledge base may include, for example, weighting associated grammars, language patterns, and/or language templates of the expanded explicit models of language with respect to corresponding contexts (e.g., domain-specific contexts, etc.) based on the scoring of erroneous natural language responses. That is, various syntactic and semantic relationships may be variously altered (e.g., via associated mappings) such that certain grammars, language patterns, and/or language templates are more readily used in certain contexts.

The updated knowledge base may be implemented by the NLG system to support and facilitate natural language communications with an end-user, in accordance with embodiments of the present invention.

As an example to illustrate an embodiment of the present invention, a test pattern for an NLG system (as represented by a knowledge base of the NLG system) may include "thank you, [end-user], for your interest in our service." The NLG system may be implemented as part of a QA system. The end-user, Alice, asks the QA system "What is wrong with X service?" The Q/A system arrives at a fact: "[what is] wrong |X Service|>[it is] offline." The QA system generates a pattern (by way of the NLG system): "thank you [end-user], for your interest in our service. Alice reads the sentence, and as natural behavior when reading something that isn't correct, fixates on the incorrect section. The fixation may correspond to Alice re-reading the "odd" grammar section of the phrase. The invention determines that Alice is fixated on the incorrect section (could be done by monitoring eye gaze, as previously described). The invention takes the pattern and determines our service can be modified as being a minor part of the sentence, which may be benign to the context of the answer itself. The invention modifies the sentence to "thank you [end-user] for your interest in the service. Alice indicates she's satisfied (could be done by prompting Alice for end-user feedback data). The invention scores the error as satisfied (e.g., via weighting associated grammars, language patterns, and/or language templates associated with "our service" and "the service" by incrementing the weight by +1. The invention updates the pattern (e.g., of the updated knowledge base).

As illustrated by the aforementioned example, the present invention may be implemented by an NLG system (e.g., as part of an NLP system such as the QA system) to improve natural language communications with end-users, for example, by enabling continuous improvement of the knowledge base by which the NLG system is applied. For example, with respect to the application of the test pattern, "thank you, [end-user], for your interest in our service," by generating the erroneous natural language response, "thank you [end-user], for your interest in our service," (e.g., via Step S204), the present invention identifies and determines an improvable performance metric or aspect of the NLG system (e.g., via Step S208), based on user feedback that is determined (e.g., via Step S206) with respect to the erroneous natural language response. The present invention updates (e.g., via Step S210) the knowledge base with respect to an explicit model of language corresponding to the erroneous natural language response. The NLG system may then implement the updated knowledge base in subsequent natural language communications with the end-users.

For example, an initial knowledge base of an NLG system may be expanded to generate an updated knowledge base based on a first natural language communication from an end-user. The NLG system may subsequently receive a second natural language communication from the end-user. The NLG system may implement the updated knowledge base to provide a natural language response to the end-user with respect to the second natural language communication. The second communication may include improved, updated or otherwise adjusted (e.g., via weighting) grammars, language patterns, and/or language templates based on the previous interaction. For example, re-weighted or otherwise adjusted mappings of part-of-speech tags for words, such as represented by the expanded explicit model of language of the updated knowledge base, may be applied in the second communication containing additional syntactic relationships and semantic relationships of the natural language communication with the end-user. Advantageously, the expanded explicit models of language may be applied to enable and account for a wider range of user actions and interactions to provide tailored responses in terms of syntax, semantics, and the like.

Figure 3:
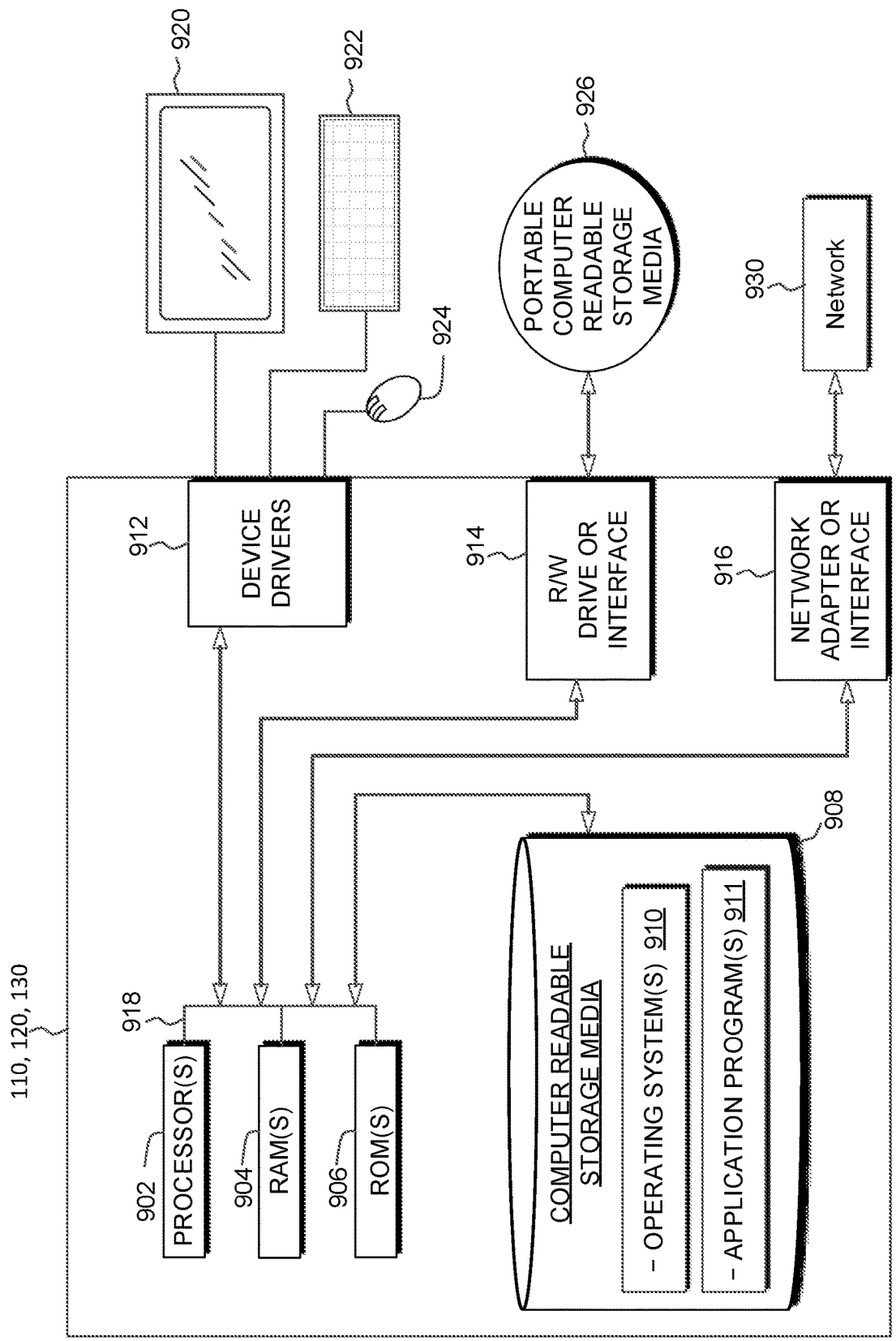
FIG. 3 is a block diagram depicting a client device, a natural language generation device, and/or a natural language generation management device, in accordance with an embodiment of the present invention.

FIG. 3 is a block diagram depicting a client device 110, an NLG device 120, and/or an NLG management device 130, in accordance with an embodiment of the present invention. As depicted in FIG. 3, the client device 110, the NLG device 120, and/or the NLG management device 130 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. The network adapter 916 communicates with a network 930. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, such as the NLG management program 140 residing on the NLG management device 130, as depicted in FIG. 1, are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The client device 110, the NLG device 120, and/or the NLG management device 130 may also include a R/W drive or interface 914 to read from and write to one or more portable computer readable storage media 926. Application programs 911 on the client device 110, the NLG device 120, and/or the NLG management device 130 may be stored on one or more of the portable computer readable storage media 926, read via the respective R/W drive or interface 914 and loaded into the respective computer readable storage media 908. The client device 110, the NLG device 120, and/or the NLG management device 130 may also include a network adapter or interface 916, such as a Transmission Control Protocol (TCP)/Internet Protocol (IP) adapter card or wireless communication adapter (such as a 4G wireless communication adapter using Orthogonal Frequency Division Multiple Access (OFDMA) technology). Application programs 911 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers. The client device 110, the NLG device 120, and/or the NLG management device 130 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may include hardware and software (stored on computer readable storage media 908 and/or ROM 906).

The NLG management device 130 can be a standalone network server, or represent functionality integrated into one or more network systems. In general, the client device 110, the NLG device 120, and/or the NLG management device 130 can be a laptop computer, desktop computer, specialized computer server, or any other computer system known in the art. In certain embodiments, the NLG management device 130 represents computer systems utilizing clustered computers and components to act as a single pool of seamless resources when accessed through a network, such as a LAN, WAN, or a combination of the two. This implementation may be preferred for data centers and for cloud computing applications. In general, the client device 110, the NLG device 120, and/or the NLG management device 130 can be any programmable electronic device, or can be any combination of such devices.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
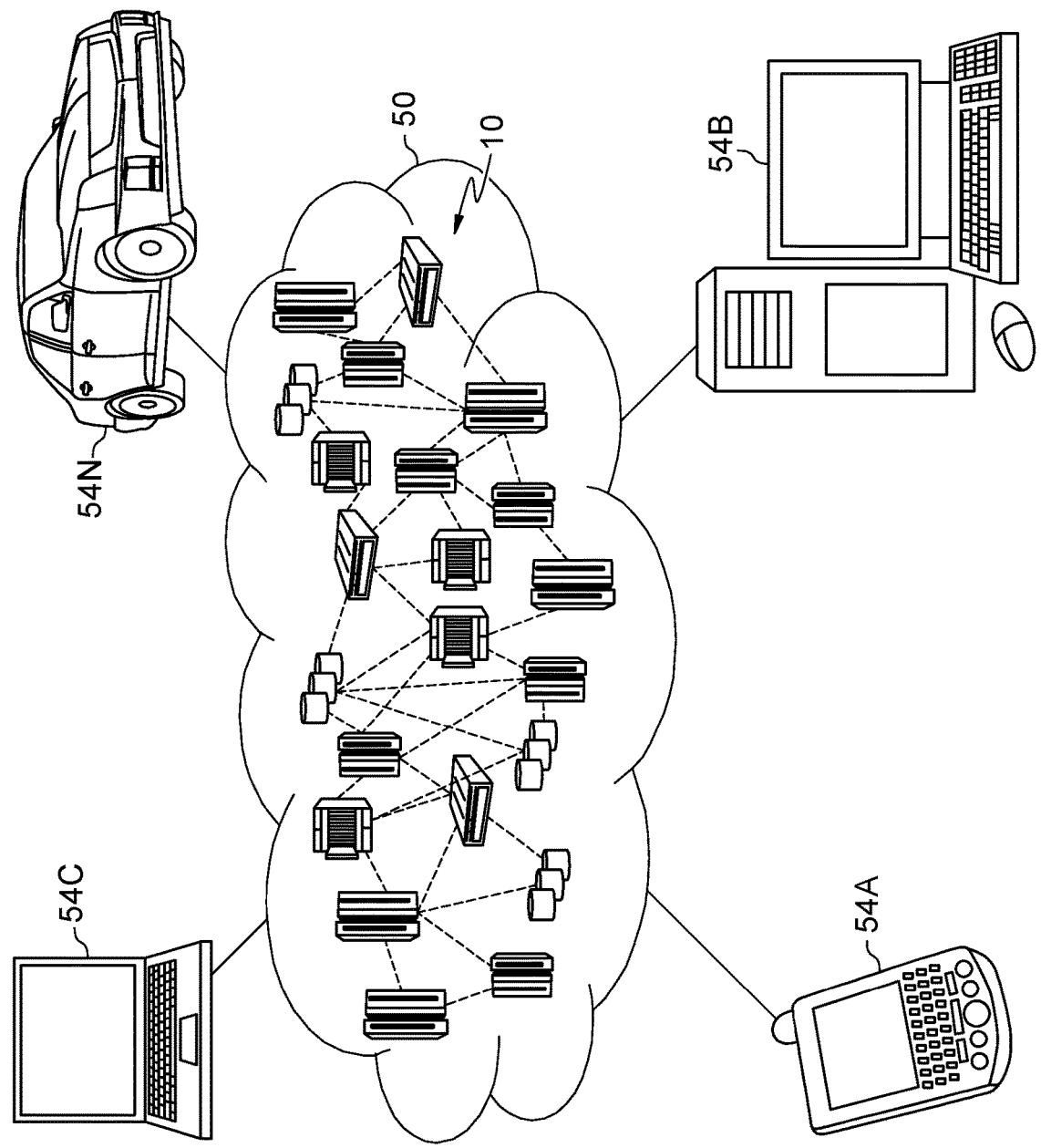
FIG. 4 depicts a cloud computing environment, in accordance with an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
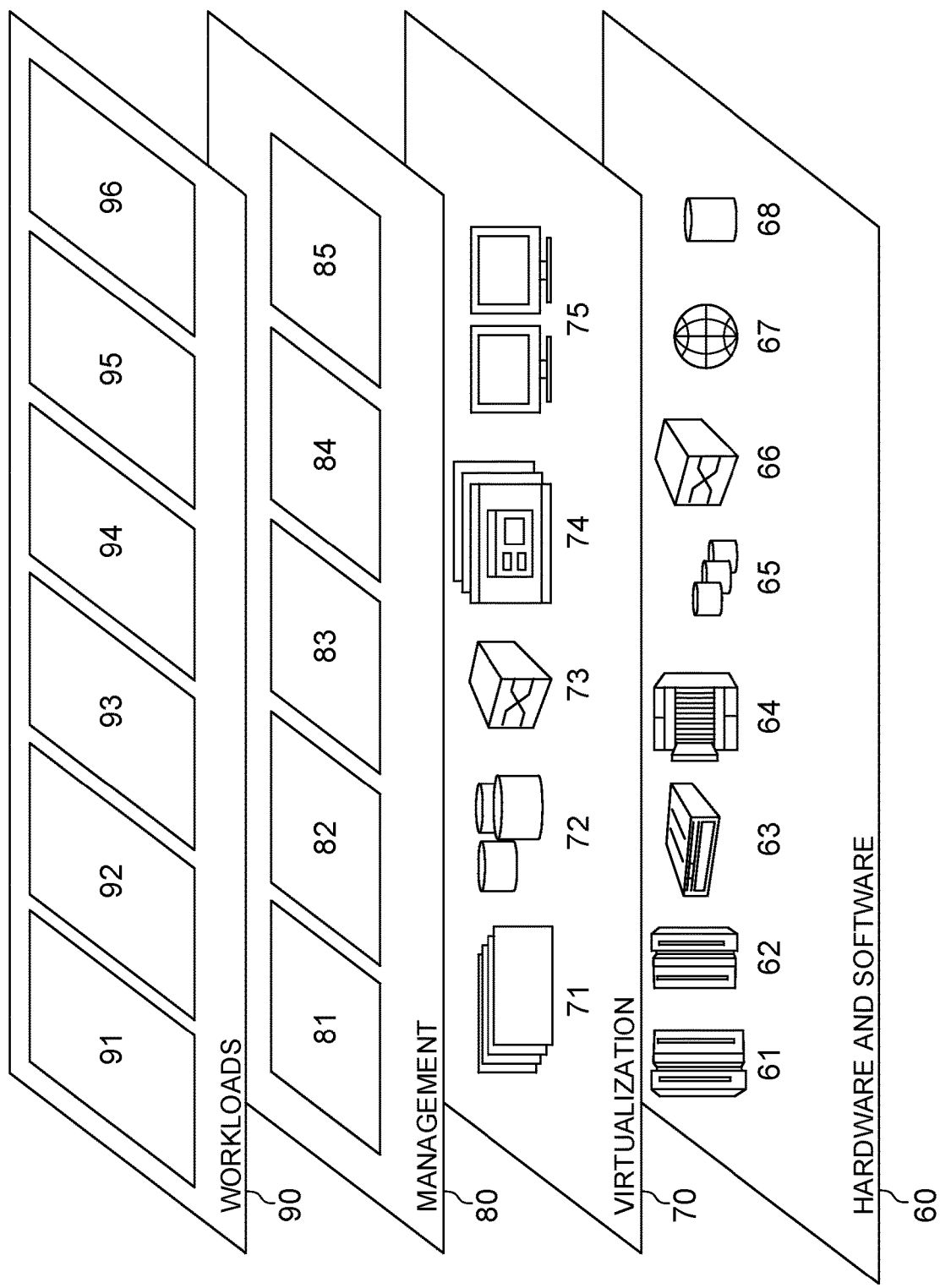
FIG. 5 depicts abstraction model layers, in accordance with an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and NLG management 96. NLG management 96 may include functionality for enabling the cloud computing environment to perform steps of the disclosed method, in accordance with embodiments of the present invention.

While the invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the present invention has been disclosed by way of example for purposes of illustration, and not limitation.

What is claimed is:

1. A computer-implemented method for improving a natural language generation knowledge base, comprising:
    detecting user input comprising a natural language expression;
    generating an erroneous natural language response based on the user input and the knowledge base;
    determining user feedback corresponding to the erroneous natural language response, wherein the user feedback comprises an indication of an end-user reaction to the erroneous natural language response;
    determining an improvable performance metric with respect to the knowledge base, wherein the improvable performance metric is based on a scoring of the erroneous natural language response, and wherein the scoring identifies a contextual defect of the knowledge base and identifies an extent to which the knowledge base is incorrectly applied, and wherein the contextual defect is selected from the group consisting of errors and defects related to syntax, semantics, morphology, and orthography, and wherein an incorrect application of the knowledge base comprises an incorrect application of grammar, language patterns, or language templates, or a combination thereof; and
    updating the knowledge base based on the improvable performance metric, wherein the knowledge base comprises an explicit model of language corresponding to the erroneous natural language response, and wherein updating the knowledge base comprises updating the explicit model of language based on the user input, the erroneous natural language response, and the user feedback.

2. The computer-implemented method of claim 1, wherein the erroneous natural language response violates one or more rules of syntax, semantics, morphology, and orthography of the natural language.

3. The computer-implemented method of claim 1, wherein determining the user feedback comprises prompting the end-user for the user feedback.

4. The computer-implemented method of claim 1, wherein determining the user feedback comprises performing end-user attention monitoring.

5. The computer-implemented method of claim 4, wherein the end-user attention monitoring comprises eye-tracking of the end-user with respect to a display instance of NLG-generated texts of the erroneous natural language response.

6. The computer-implemented method of claim 1, wherein the improvable performance metric is determined based on the user input, the erroneous natural language response, and the user feedback.

7. A computer system for improving a natural language generation knowledge base, the computer system comprising:
    one or more computer processors, one or more computer-readable storage media, and program instructions stored on one or more of the computer-readable storage media for execution by at least one of the one or more computer processors, the program instructions, when executed by the at least one of the one or more computer processors, causing the computer system to perform a method comprising:
    detecting user input comprising a natural language expression;
    generating an erroneous natural language response based on the user input and the knowledge base;
    determining user feedback corresponding to the erroneous natural language response, wherein the user feedback comprises an indication of an end-user reaction to the erroneous natural language response;
    determining an improvable performance metric with respect to the knowledge base, wherein the improvable performance metric is based on a scoring of the erroneous natural language response, and wherein the scoring identifies a contextual defect of the knowledge base and identifies an extent to which the knowledge base is incorrectly applied, and wherein the contextual defect is selected from the group consisting of errors and defects related to syntax, semantics, morphology, and orthography, and wherein an incorrect application of the knowledge base comprises an incorrect application of grammar, language patterns, or language templates, or a combination thereof; and updating the knowledge base based on the improvable performance metric, wherein the knowledge base comprises an explicit model of language corresponding to the erroneous natural language response, and wherein updating the knowledge base comprises updating the explicit model of language based on the user input, the erroneous natural language response, and the user feedback.

8. The computer system of claim 7, wherein the erroneous natural language response violates one or more rules of syntax, semantics, morphology, and orthography of the natural language.

9. The computer system of claim 7, wherein determining the user feedback comprises prompting the end-user for the user feedback.

10. The computer system of claim 7, wherein determining the user feedback comprises performing end-user attention monitoring.

11. The computer system of claim 10, wherein the end-user attention monitoring comprises eye-tracking of the end-user with respect to a display instance of NLG-generated texts of the erroneous natural language response.

12. The computer system of claim 7, wherein the improvable performance metric is determined based on the user input, the erroneous natural language response, and the user feedback.

13. A computer program product for improving a natural language generation knowledge base, the computer program product comprising:
one or more computer-readable storage devices and program instructions stored on at least one of the one or more computer-readable storage devices for execution by at least one or more computer processors of a computer system, the program instructions, when executed by the at least one of the one or more computer processors, causing the computer system to perform a method comprising:
detecting user input comprising a natural language expression;
generating an erroneous natural language response based on the user input and the knowledge base;
determining user feedback corresponding to the erroneous natural language response, wherein the user feedback comprises an indication of an end-user reaction to the erroneous natural language response;
determining an improvable performance metric with respect to the knowledge base, wherein the improvable performance metric is based on a scoring of the erroneous natural language response, and wherein the scoring identifies a contextual defect of the knowledge base and identifies an extent to which the knowledge base is incorrectly applied, and wherein the contextual defect is selected from the group consisting of errors and defects related to syntax, semantics, morphology, and orthography, and wherein an incorrect application of the knowledge base comprises an incorrect application of grammar, language patterns, it language templates, or a combination thereof; and
updating the knowledge base based on the improvable performance metric, wherein the knowledge base comprises an explicit model of language corresponding to the erroneous natural language response, and wherein updating the knowledge base comprises updating the explicit model of language based on the user input, the erroneous natural language response, and the user feedback.

14. The computer program product of claim 13, wherein the erroneous natural language response violates one or more rules of syntax, semantics, morphology, and orthography of the natural language.

15. The computer program product of claim 13, wherein determining the user feedback comprises prompting the end-user for the user feedback.

16. The computer program product of claim 13, wherein determining the user feedback comprises performing end-user attention monitoring.

17. The computer program product of claim 16, wherein the end-user attention monitoring comprises eye-tracking of the end-user with respect to a display instance of NLG-generated texts of the erroneous natural language response.

18. The computer program product of claim 13, wherein the improvable performance metric is determined based on the user input, the erroneous natural language response, and the user feedback.

* * * * *